United States Patent
Ganesan et al.

(10) Patent No.: US 10,200,198 B2
(45) Date of Patent: Feb. 5, 2019

(54) MAKING CRYPTOGRAPHIC CLAIMS ABOUT STORED DATA USING AN ANCHORING SYSTEM

(71) Applicant: PeerNova, Inc., San Jose, CA (US)

(72) Inventors: Gangesh Kumar Ganesan, Mountain View, CA (US); David John Hudson, Gwynedd (GB)

(73) Assignee: PeerNova, Inc., San Jose, CA (US)

( * ) Notice: Subject to any disclaimer, the term of this patent is extended or adjusted under 35 U.S.C. 154(b) by 110 days.

(21) Appl. No.: 15/179,627

(22) Filed: Jun. 10, 2016

(65) Prior Publication Data

US 2016/0365978 A1    Dec. 15, 2016

Related U.S. Application Data (60) Provisional application No. 62/174,451, filed on Jun. 11, 2015.

(51) Int. Cl.
*H04L 29/06* (2006.01)
*H04L 9/32* (2006.01)
*G06F 17/30* (2006.01)
*H04L 9/14* (2006.01)
*H04L 9/06* (2006.01)

(52) U.S. Cl.
CPC ........ *H04L 9/3239* (2013.01); *G06F 17/3033* (2013.01); *G06F 17/30371* (2013.01); *H04L 9/0618* (2013.01); *H04L 9/0643* (2013.01); *H04L 9/14* (2013.01); *H04L 2209/56* (2013.01)

(58) Field of Classification Search
CPC .................................................... H04L 9/3239
See application file for complete search history.

(56) References Cited

U.S. PATENT DOCUMENTS 6,149,522 A  * 11/2000  Alcorn ................... G06F 21/00
                                                          463/29
6,584,459 B1    6/2003  Chang et al.
7,584,223 B1 †  9/2009  Pinkas
(Continued)

OTHER PUBLICATIONS

PCT International Search Report and Written Opinion, PCT Application No. PCT/US16/37059, dated Feb. 24, 2017, 14 pages.
(Continued)

*Primary Examiner* — Ali Shayanfar
(74) *Attorney, Agent, or Firm* — Fenwick & West LLP (57) ABSTRACT

A data storage system creates a data signature for a data element that is to be stored by hashing the data element. The data storage system also creates a sequence signature for the data element and stores the sequence signature in a signature database. The sequence signature is created using the data signature of the data element and the previous sequence signature stored in the signature database. The data storage system transmits a copy of the sequence signature to an anchor system. The anchor system stores the copy as an export anchor and creates an import anchor based on the export anchor and information associated with the present time. The anchor system stores the import anchor and transmits a copy to the data storage system. An audit system uses the export anchor and import anchor to determine whether data stored by the data storage system has been modified.

18 Claims, 9 Drawing Sheets

(56) References Cited

U.S. PATENT DOCUMENTS

| | | | |
|---|---|---|---|
| 8,898,482 B2* | 11/2014 | Templin | H04L 9/0869 |
| | | | 713/193 |
| 9,112,860 B2* | 8/2015 | Perez | H04L 9/0869 |
| 9,529,923 B1* | 12/2016 | Baird, III | H04L 67/1097 |
| 2004/0107346 A1 | 6/2004 | Goodrich et al. | |
| 2007/0276843 A1* | 11/2007 | Lillibridge | G06F 17/30073 |
| 2008/0205653 A1* | 8/2008 | Haddad | H04L 29/12811 |
| | | | 380/278 |
| 2010/0043057 A1 | 2/2010 | Di Battista et al. | |
| 2010/0082865 A1* | 4/2010 | Kirshenbaum | G06F 21/6218 |
| | | | 710/113 |
| 2010/0313024 A1* | 12/2010 | Weniger | H04L 63/0823 |
| | | | 713/170 |
| 2011/0202761 A1* | 8/2011 | Sarela | H04L 12/189 |
| | | | 713/163 |
| 2013/0198854 A1 | 8/2013 | Erway et al. | |
| 2014/0205092 A1 | 7/2014 | Hartley et al. | |
| 2014/0245020 A1 | 8/2014 | Buldas et al. | |
| 2015/0271183 A1* | 9/2015 | MacGregor | H04L 63/102 |
| | | | 726/4 |
| 2015/0278397 A1* | 10/2015 | Hendrickson | G06F 17/30958 |
| | | | 707/798 |
| 2015/0281092 A1* | 10/2015 | Benz | H04L 47/125 |
| | | | 370/230 |
| 2015/0378774 A1* | 12/2015 | Vermeulen | G06F 17/30578 |
| | | | 707/703 |
| 2016/0127307 A1* | 5/2016 | Jain | G06F 3/0619 |
| | | | 709/245 |
| 2016/0253622 A1† | 9/2016 | Sriram et al. | |
| 2016/0292396 A1* | 10/2016 | Akerwall | G06F 21/645 |
| 2016/0292672 A1* | 10/2016 | Fay | G06Q 20/363 |
| 2017/0337380 A1* | 11/2017 | Domke | H04L 9/0869 |

OTHER PUBLICATIONS

European Extended Search Report, European Application No. 16842460.4, dated Nov. 29, 2018, 8 pages.

Snow, P. et al., "Factom Business Processes Secured by Immutable Audit Trails on the Blockchain," Nov. 17, 2014, 38 pages, [Online] [Retrieved on Jun. 14, 2017] Retrieved from the Internet<URL:https://github.com/FactomProject/FactomDocs/raw/master/Factom_Whitepaper.pdf>.

\* cited by examiner
† cited by third party

MAKING CRYPTOGRAPHIC CLAIMS ABOUT STORED DATA USING AN ANCHORING SYSTEM

CROSS REFERENCE TO RELATED APPLICATION

This application claims the benefit of U.S. Provisional Application No. 62/174,451, filed Jun. 11, 2015, which is incorporated by reference herein in its entirety.

BACKGROUND

1. Field of Art

The present disclosure generally pertains to the storage of data, and in particular to making cryptographic claims about data using an external system that provides independent third parties cryptographic assurances about the validity, integrity and immutability of the data.

2. Description of the Related Art

Data is stored in storage systems that are designed to reuse the same storage space. As a result, stored data can be overwritten with new data. This feature is problematic when storing records that should be immutable. As an example, banking records relating to banking transactions should be immutable because any changes to the records (e.g., by an unauthorized party) can cause account balances to be inaccurate. Thus, there is a need to be able to detect when data that should have been immutable is modified.

SUMMARY

In one embodiment, when a data storage system identifies a data element that is to be stored, the data storage system creates a data signature for the data element by applying a one-way cryptographic hash function to the data element. The data signature is unique to the data element. The data storage system also creates a sequence signature for the data element and stores the sequence signature in a signature database. The sequence signature is created using the data signature of the data element and the previous sequence signature stored in the signature database. Using the preceding sequence signature to create the next sequence signature allows sequence signatures to be chronologically and cryptographically linked in the signature database. The data storage system uses the sequence signature created for the data element as a key to store the data element in a key-value database.

Additional data elements stored in the key-value database go through the same process and as a result the signature database includes a sequence signature for each data element stored in the key-value database. Certain sequence signatures stored in the signature database are transmitted by the data storage system to an anchor system for storage. The anchor system maintains its own copy of the sequence signatures so they can be used by an audit system to later determine whether data stored by the data storage system has been modified. In one embodiment, which sequence signatures are transmitted to the anchor system is dependent on settings set by a system administrator. For example, according to the settings, every third sequence signature stored may be transmitted to the anchor system.

The sequence signatures transmitted to the anchor system are referred to as export anchors. The anchor system stores the export anchors received from the data storage system. In one embodiment, for every export anchor received by the anchor system, the anchor system creates an import anchor. The anchor system creates the import anchor by hashing the export anchor with information associated with a time stamp corresponding to the time at which the import anchor is created, for example, the present time (e.g., a time stamp signed by a time stamping authority). The anchor system stores the import anchor and also transmits the import anchor to the data storage system. The data storage system 102 stores the import anchor in the signature database like any other sequence signature and the import anchor is linked with the already stored sequence signatures. Since the import hash is created using information associated with the present time, it makes it infeasible for the import anchor to be recreated in the future. Additionally, the import hash provides proof of time among the linked sequence signatures.

When the audit system determines to audit the data storage system for purposes of determining whether stored data has been altered, the audit system retrieves export anchors and import anchors from the anchor system. Each retrieved export anchor is compared by the audit system to a sequence signature stored in the data storage system's signature database that corresponds to a data element for which the export anchor was generated. If an export anchor and the sequence signature compared to do not match, the audit system determines that data of the data storage system has been tampered with and modified. The audit system also compares each retrieved import anchor with its corresponding import anchor stored by the data storage system. If the import anchors do not match, the audit system determines that data has been modified.

Hence, the data stored by the data storage system can be audited in real time using mathematical cryptographic proofs for purposes of ensuring that stored data has not been modified. Further, the entity managing the data storage system can control which entities receive the export anchors and have access to the data of the data storage system for purposes of auditing the system. For example, if the data storage system is the storage system of a financial institution, the financial institution can allow government regulators or other trusted third parties auditors to receive the anchors as they are created and periodically audit the data stored by the data storage system.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
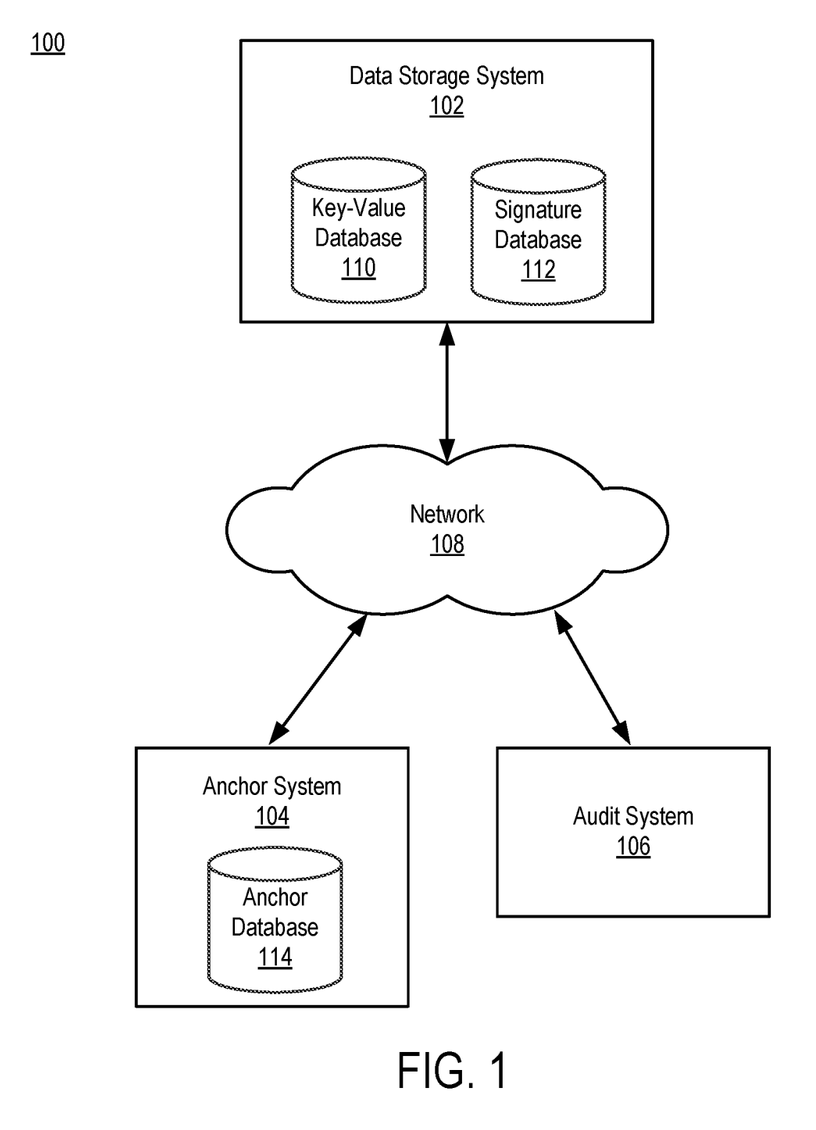
FIG. 1 is a detailed view of a data storage environment in accordance with one embodiment.

FIG. 1 is a detailed view of a data storage environment 100 in accordance with one embodiment. The data storage environment 100 includes a data storage system 102, an anchor system 104, and an audit system 106 connected via a network 108. Although the illustrated environment 100 includes only a select number of each entity, other embodiments can include more or less of each entity.

The network 108 represents the communication pathways between the data storage system 102, the anchor system 104, and the audit systems 106. In one embodiment, the network 108 is the Internet and uses standard communications technologies and/or protocols. The network 108 can also utilize dedicated, custom, or private communications links that are not necessarily part of the Internet. The network 108 may comprise any combination of local area and/or wide area networks, using both wired and wireless communication systems. In one embodiment, information exchanged via the network 108 is cryptographically encrypted and decrypted using cryptographic keys of the senders and the intended recipients.

The data storage system 102 is a system that allows for the storage of data elements. The data stored by the data storage system 102 is intended to be immutable. As a result, the data storage system 102 performs specific processes to ensure that any changes to the stored data can be detected as described in detail below. The data storage system 102 includes a key-value database 110 and a signature database 112. In this embodiment, the key-value database 110 and the signature database 112 are shown as being part of the data storage system 102. However, in other embodiments the key-value database 110 and the signature database 112 may be separate from the data storage system 102 but accessible by the data storage system 102.

The key-value database 110 stores data elements that users of the data storage system 102 have requested be stored. Each stored data element is associated with a key. The data element associated with the key is the value of a created key-value pair. The key is used to store the data element in the key-value database 110. The key is also used to query the key-value database 110 and retrieve the stored data element. Although the database 110 is described here as being a key-value database 110 in other embodiments the database 110 may be any other type of database 110 (e.g., any other type of NoSQL database).

The signature database 112 stores sequence signatures generated when storing data elements in the key-value database 110. Sequence signatures as described in further detail below with reference to audit system 106 are cryptographic hashes used to determine whether data stored by the data storage system 102 has been altered. In one embodiment, the signature database 112 is a directed acyclic graph. The signature database 112 includes multiple nodes (may also be referred to as vertices). Each node includes a sequence signature. The node most recently added to signature database 112 (the last added node) is referred to as the root node and it is connected via an edge to the previous root node.

The data storage system 102 processes requests to store data elements. The requests may be received from users or other systems. In one embodiment, the entity managing the data storage system 102 controls which entities have permission to store data with the data storage system 102. A data element stored by the data storage system 102 may be, for example, a transaction, a document, or any other collection of related data. As described further below with reference to FIG. 3, a data element may also be one piece of a larger collection of data. For example, for a banking transaction in which funds are transferred between two entities, the transaction may be broken down into data elements that include an identifier of transferring entity, an identifier of receiving entity, and an amount of the transfer.

When a request is received to store a data element, the data storage system 102 creates a data signature for the data element. The data signature is created by applying a hash function to the data element. The hash function is a one-way function that makes it infeasible to recover the data element from the data signature. In one embodiment, the hash function applied is an SHA-256 (Secure Hash Algorithm-256) function. Since the data signature is created using the data element, the data signature is unique to the data element.

The data storage system 102 uses the data signature to create a sequence signature for the data element. To create the sequence signature the data storage system 102 identifies the root node in the signature database 112. The data storage system 102 hashes the sequence signature included in the root node with the data signature of the data element to create the sequence signature for the data element.

In one embodiment, the data storage system 102 uses the created sequence signature as the key to store the data element in the key-value database 110. In another embodiment, the data storage system 102 uses the data signature of the data element to store the element in the key-value database 110. The data storage system 102 may encode or transform the data element prior to storing it in the key-value database 110.

The data storage system 102 stores a new node in the signature database 112 that includes the created sequence signature. In one embodiment, with the sequence signature the data storage system 102 stores metadata, such as when the sequence signature was created, when the data element was stored or other data associated with the data element. The newly stored node becomes the root node of the signature database 112 and the node is connected to the previous root node via an edge. Since each node added to signature database 112 is connected to the previous root node, the nodes in the signature database 112 form a chain of sequence signatures that are in chronological order based on when they were added to the signature database 112 (i.e., based on when the corresponding data elements were stored). Further, since each sequence signature in the chain is created based on the previously stored sequence signatures, the sequence signatures are cryptographically linked.

As an example, assume data element 0 is stored in the key-value database 110 and sequence signature 0 of data element 0 is the first sequence signature stored in the signature database 112. When data element 1 is to be stored, data signature 1 is created from hashing data element 1. Sequence signature 1 for data element 1 is created by hashing data signature 1 and sequence signature 0. Sequence signature 1 is stored in the signature database. Sequence signature 2 for data element 2 is then created by hashing data signature 2 and sequence signature 1. Sequence signature 2 is stored in the signature database 112 and linked to sequence signature 1.

When a sequence signature is created for a data element and stored in the signature database 112, the data storage system 102 determines whether to transmit the sequence signature to the anchor system 104. The anchor system 104 maintains its own copies of sequence signatures stored by the data storage system 102. The copies of the sequence signatures are used by the audit system 106 when auditing the data storage system 102 to determine whether data stored by the data storage system 102 has been modified. The data storage system 102 can select the entities to which it provides sequence signatures and access to its stored data for purposes of auditing the data storage system 102.

The data storage system 102 determines whether to transmit the sequence signature to the anchor system 104 according to settings set, for example, by a system administrator. In one embodiment, the settings indicate after how many new creations of sequence signatures a sequence signature should be sent to the anchor system 104. For example, the settings may indicate that every newly created sequence signature be sent to the anchor system 104 or that every other newly created sequence signature be sent to the anchor system 104. In another embodiment, the settings indicate that periodically (e.g., every minute) the data storage system 102 send the sequence signature currently being created or the next sequence signature created. If the data storage system 102 determines to transmit the sequence signature based on the settings, the data storage system 102 transmits the sequence signature to the anchor system 104. A sequence signature transmitted to the anchor system 104 is referred to as an export anchor.

In one embodiment, for a sequence signature transmitted to the anchor system 104, the data storage system 102 creates a puzzle anchor. To create the puzzle anchor, the anchor system 104 solves a cryptographic puzzle using the sequence signature received from the data storage system 102. In one embodiment, the sequence signature is an input to the puzzle. The data storage system 102 receives the answer to the puzzle from the anchor system 104. The data storage system 102 hashes the answer with the sequence signature to create the puzzle anchor. The data storage system 102 stores the puzzle anchor, for example, in the signature database 112. The puzzle anchor is a way to quantitatively measure the level of security that is applied to the data based on the complexity of the puzzle. If a malicious entity wanted to tamper with the data, the entity would have to exactly match the signature transmitted to and stored by the anchor system 104. However, the cryptographic puzzles are setup in a way that solving the puzzles for a second set of inputs (tampered inputs) is computationally infeasible.

The anchor system 104 maintains anchors used for auditing the data storage system 102. In one embodiment, the anchor system 104 is managed by the audit system 106 and provides the audit system 106 with its own copies of sequence signatures/export anchors that can be used to determine whether data stored by the data storage system 102 has been altered. The anchor system 104 includes an anchor database 114 that stores export anchors received from the data storage system 102 and import anchors created by the anchor system 104. The data storage system 102 has no access to the anchors stored by the anchor system 104. Since the anchors stored by the anchor system 104 are used to audit the data storage system 102, the anchor system 104 is maintained to be separate from the data storage system 102 (i.e., a different entity manage the anchor system 104). If data storage system 102 has a security breach, the data stored by the anchor system 104 will not be susceptible to being modified.

When the anchor system 104 receives an export anchor from the data storage system 102, the anchor system 104 stores the export anchor in the anchor database 114. In one embodiment, with the export anchor the anchor system 104 stores as metadata an identifier received from the data storage system 102 that indicates the node (storage location) in which the corresponding sequence signature is stored in the signature database 112. The corresponding sequence signature is the signature that matched the export anchor when the export anchor was transmitted to the anchor system 104.

Additionally, the anchor system 104 creates an import anchor using the export anchor. The anchor system 104 creates the import anchor by hashing the export anchor with information associated with the time at which the import anchor is created, for example, the present time (e.g., current date and/or current clock time). Since the import hash is created using information associated with the present, it makes it infeasible for the import anchor to be recreated in the future. Hence, the import hash provides proof that it was created on the current date and/or time.

In one embodiment, to create the import anchor the anchor system 104 may request a time stamp with the current date and/or time from a third party entity. The third party entity is a trusted time stamping authority. The anchor system 104 receives the time stamp signed by the time stamping authority and hashes the time stamp with the export anchor to create the import anchor. In another embodiment, the anchor system 104 has a copy of the export anchor stored in a Bitcoin blockchain. The anchor system 104 receives the block number of the block in which the copy was stored in the blockchain and hashes the block number with the export anchor to create the import anchor. In another embodiment, the anchor system 104 creates the import anchor by hashing the export anchor with information from a current publication. For example, the export anchor may be hashed with the text from the front page of a newspaper published on that day.

The anchor system 104 stores the import anchor in the anchor database 114. Additionally, the anchor system 104 transmits the import anchor to the data storage system 102. The data storage system 102 creates a new node in the signature database 112 and stores the import anchor in the new node. The import anchor becomes the new root node in the signature database 112 and is connected to the previous root node. In the chain of sequence signatures stored by the signature database 112 an import anchor provides proof of time and makes it infeasible for the chain of signatures stored by the signature database 112 to be recreated or altered, for example, by a malicious entity trying to modify the data stored by the data storage system 102. In one embodiment, an identifier of the node in which the import anchor is added in the signature database 112 is stored with the import anchor as metadata in the anchor database 114.

The audit system 106 is a computer system with the capabilities to audit the data storage system 102 to determine if data stored by the data storage system 102 has been altered. The audit system 106 may be, for example, the computer system of a federal agency or some other trusted third-party auditor. The audit system 106 may audit the data storage system 102 periodically or upon request from a user of the audit system 106. The audit system 106 has access to the data stored by the data storage system 102 in order to be able to audit the data storage system 102. Permission to access the data is granted by the data storage system 102.

When the audit system 106 determines to audit the data storage system 102, the audit system 106 retrieves export and import anchors from the anchor database 114. In one embodiment, the audit system 106 retrieves all of the anchors stored in the anchor database 114. In another embodiment, the audit system 106 retrieves select anchors (a subset of the stored anchors). For example, the audit system 106 may retrieve a random sampling of anchors.

For each export anchor retrieved, the audit system 106 identifies the node in the signature database 112 that is supposed to store the corresponding sequence signature of such export anchor. In one embodiment, the node is identified using an identifier of the node stored as metadata with the export anchor in the anchor database 114. The audit system 106 compares the export anchor with the sequence signature in the identified node. If the export anchor and the sequence signature do not match, the audit system 106 determines that data stored by the data storage system 102 has been tampered with and modified. At the very least, the original sequence signature stored in the identified node has been modified. As an example, if there was a security breach and an unauthorized entity modified a data element in the key-value database 110 along with sequence signatures in the signature database 112, the modification would be detected when the export anchors are compared to sequence signatures from the signature database 112.

In one embodiment, for a retrieved export anchor, the audit system 106 also uses the export anchor as a key and retrieves from the key-value database 110 the data element associated with the key. The audit system 106 generates a hash of the data element using the same hashing function used by the data storage system 102 to generate data signatures. The audit system 106 identifies the sequence signature corresponding to the export anchor in the signature database 112. The audit system 106 identifies the sequence signature preceding the identified signature in the chain of sequence signatures. The audit system 106 hashes the preceding sequence signature with the hash of the retrieved data element. If the result of the hash does not match the export anchor, the audit system 106 determines that the data element that corresponds to the export anchor has been modified. The export anchor was generated using the preceding sequence signature and the original data element stored in association with the export anchor. Hence, the hash of the preceding sequence signature and the retrieved data element should be the same as the export anchor.

Additionally, for each import anchor retrieved by the audit system 106 from the anchor database 114, the audit system 106 identifies the node that is supposed to store the corresponding import anchor. The audit system 106 compares the retrieved import anchor with the import anchor in the identified node. If the import anchors do not match it signifies that data stored by the data storage system 102 has been modified. At the very least, the chain of signatures of the signature database 112 has been modified.

Figure 2A:
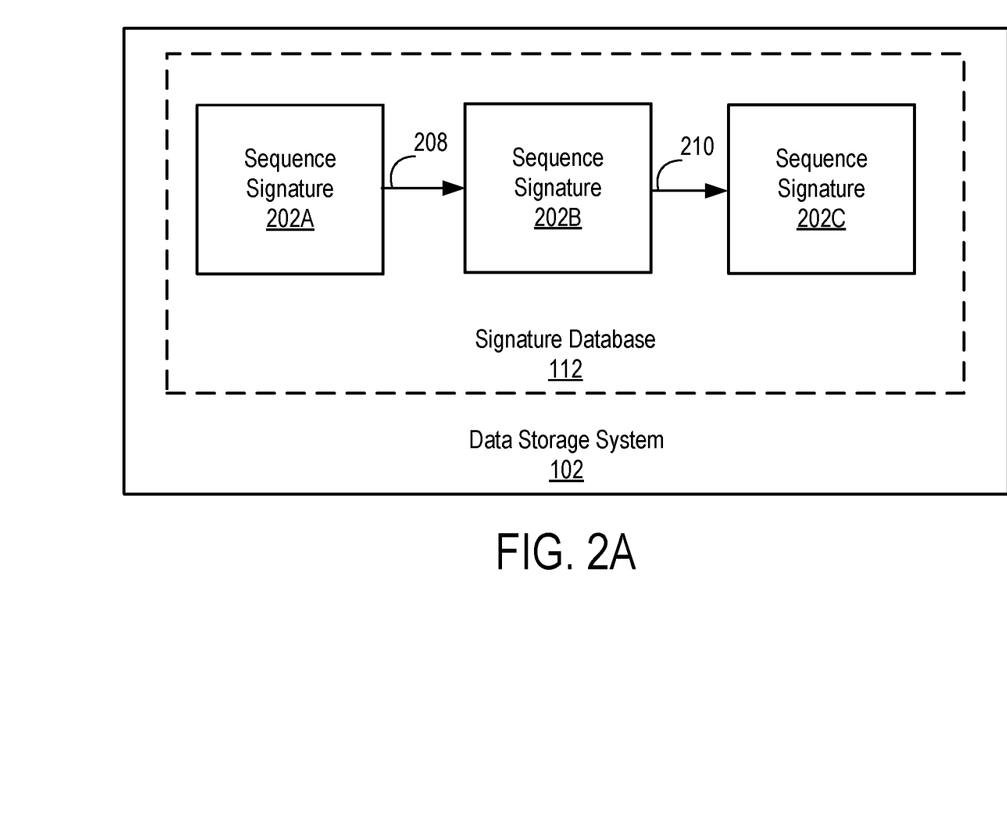
FIGS. 2A-2C are examples of sequence signatures and anchors being stored in accordance with one embodiment.
Figure 2B:
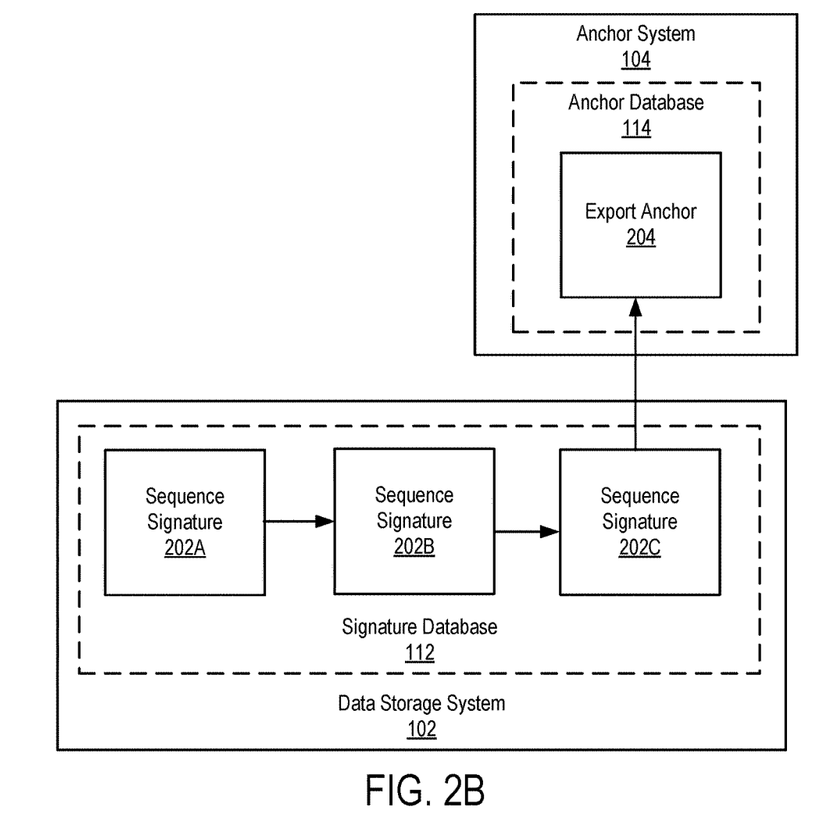
Figure 2C:
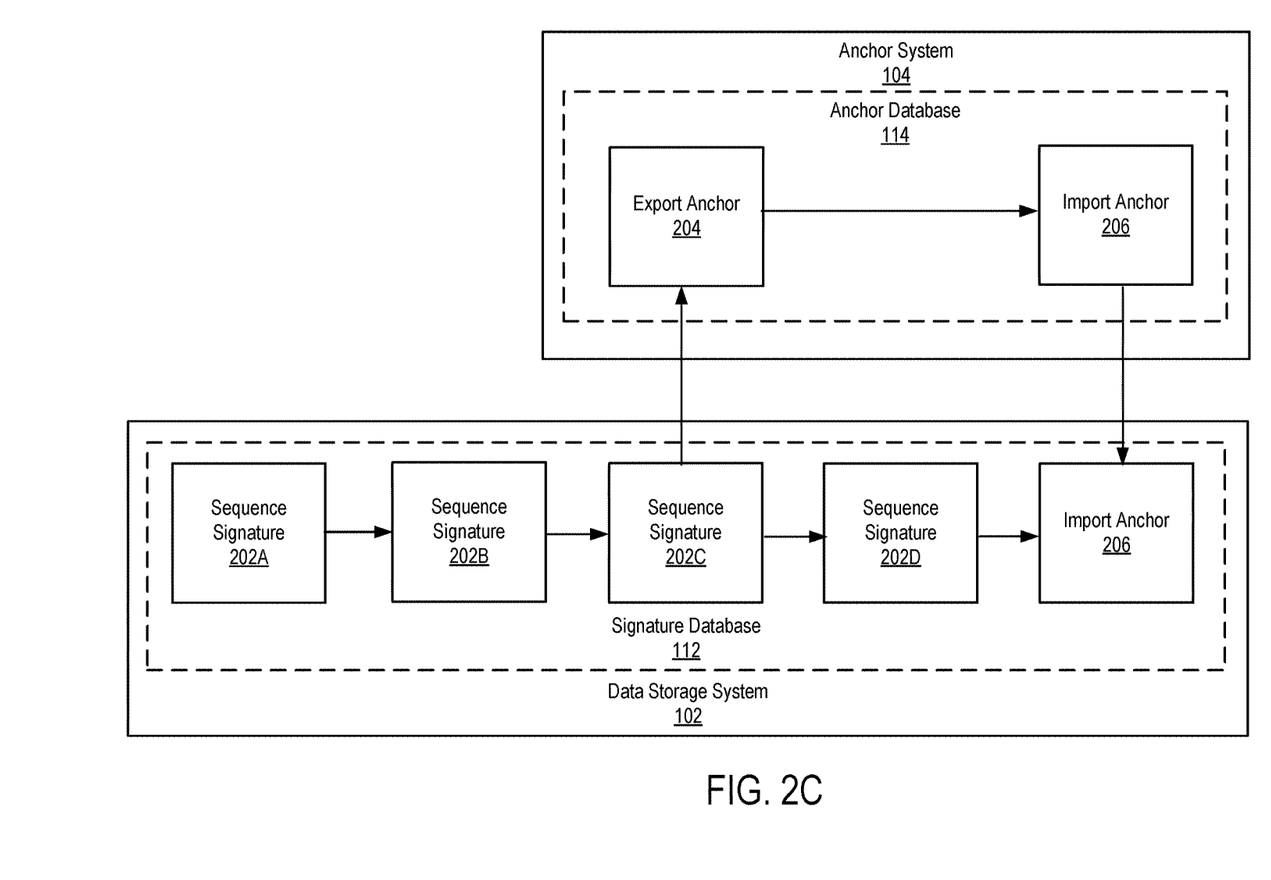

FIGS. 2A-2C are examples of sequence signatures and anchors being stored in accordance with one embodiment. FIG. 2A illustrates the signature database 112 of the data storage system 102 storing sequence signatures 202A, 202B, and 202C. Sequence signature 202B was created based on sequence signature 202A and its respective data element. Sequence signature 202C was created based on sequence signature 202B and its respective data element. The sequence signatures 202A, 202B, and 202C are connected via edges 208 and 210.

As illustrated in FIG. 2B, the data storage system 102 determines to transmit the sequence signature 202C to the anchor system 104. The data storage system 102 transmits the sequence signature 202C as export anchor 204. The anchor system 104 stores the export anchor 204 in the anchor database 114.

FIG. 2C illustrates that based on the export anchor 204, the anchor system 104 creates import anchor 206 and stores the import anchor 206 in the anchor database 114. The anchor system 104 transmits the import anchor 206 to the data storage system 102. During the creation of the import anchor 206, the data storage system 102 added sequence signature 202D to the chain of sequence signatures. Sequence signature 202D is created for another data element stored in between exporting the export anchor and the data storage system 102 receiving the import anchor 206. The data storage system 102 stores the import anchor 206 in the signature database 112 connected to sequence signature 202D.

When the audit system 106 audits the data storage system 102, the audit system 106 compares export anchor 204 to the data currently stored in the node of the signature database 112 originally storing the sequence signature 202C. The audit system 106 also compares the import anchor 206 stored by the anchor database 114 with the node of the signature database 112 originally storing the import anchor 206. If the export anchor 204 or the import anchor 206 do not match with the corresponding sequence signatures in the signature database 112, the audit system 106 determines that data stored by the data storage system 102 has been modified.

Figure 3:
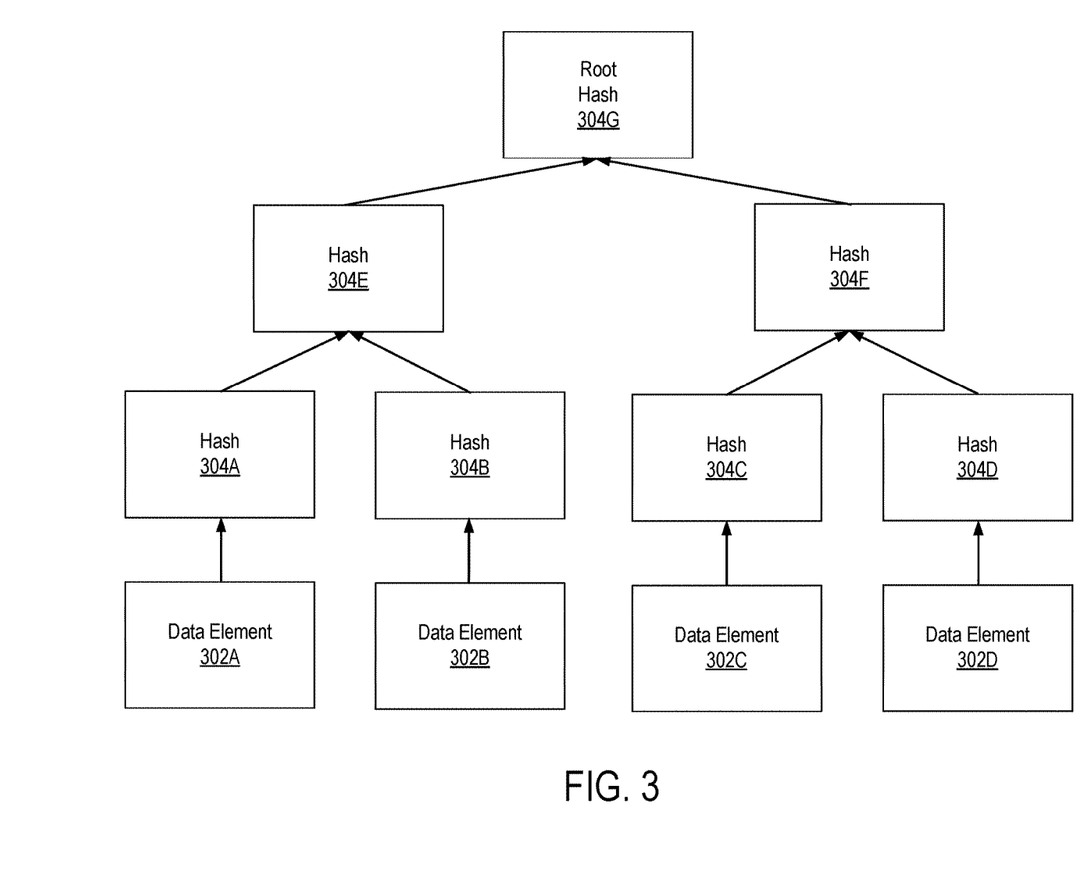
FIG. 3 is a block diagram illustrating hashes created for a collection of data in accordance with one embodiment.

As described above, a data element stored in the key-value database 110 may be a piece of a larger collection of related data. When the data storage system 102 receives a request to store the collection of data, the data storage system 102 breaks the collection down into data elements. In one embodiment, instead of generating sequence signatures for each individual data element as described above, the data storage system 102 generates a sequence signature for the entire collection. FIG. 3 illustrates an example where a collection of data has been broken down into data elements 302A, 302B, 302C, and 302D. For example, the collection may be a banking transaction where Bob transfer $200 to Mary. In breaking the transaction into elements, data element 302A may correspond to an identifier of the transaction (e.g. a transaction number), data element 302B corresponds to an identifier of the transferor (Bob), data element 302C corresponds to an identifier of the receiving party (Maria), and data element 302D corresponds to the amount of the transaction ($200).

A hash function is applied to each data element 302A, 302B, 302C, and 302D to generate hashes 304A, 304B, 304C, and 304D. Hash 304A corresponds to data element 302A, hash 304B corresponds to data element 302B, hash 304C corresponds to data element 302C, and hash 304D corresponds to data element 302D. The data storage system 102 stores each data element 302A-302D in the key-value database 110 using its corresponding hash 304A-304D as the key.

Additionally, to generate the sequence signature for the collection, the data storage system 102 pairs up the hashes 304A-304D of the data elements and hashes each pair together. In this example, hash 304A is paired with hash 304B and the resulting hash is hash 304E. Additionally, hash 304C is paired with hash 304D and the resulting hash is hash 304F. Hashes 304E and 304F are hashed together to get hash 304G. Hash 304G is the root hash of the collection. Hence, a binary "Merkle" tree of hashes is created.

The data storage system 102 identifies the root node in the signature database 112 and hashes the sequence signature included in the root node with the root hash 304G to create the sequence signature for the collection. The data storage system 102 stores a new node in the signature database 112 that includes the newly created sequence signature for the collection. The newly stored node becomes the new root node of the signature database 112 and the node is connected to the previous root node via an edge. In one embodiment, the data storage system 102 stores as metadata with the sequence signature the hashes 304A-304G of the binary tree used to create the sequence signature. Each of the hashes 304A-304G is associated with one of the multiple levels of the binary tree. If the data storage system 102 determines to transmit the sequence signature to the anchor system 104 as an export anchor, the data storage system also transmits the hashes 304A-304G as metadata. The hashes 304A-304G are stored by the anchor system 104 with the export anchor.

Figure 4:
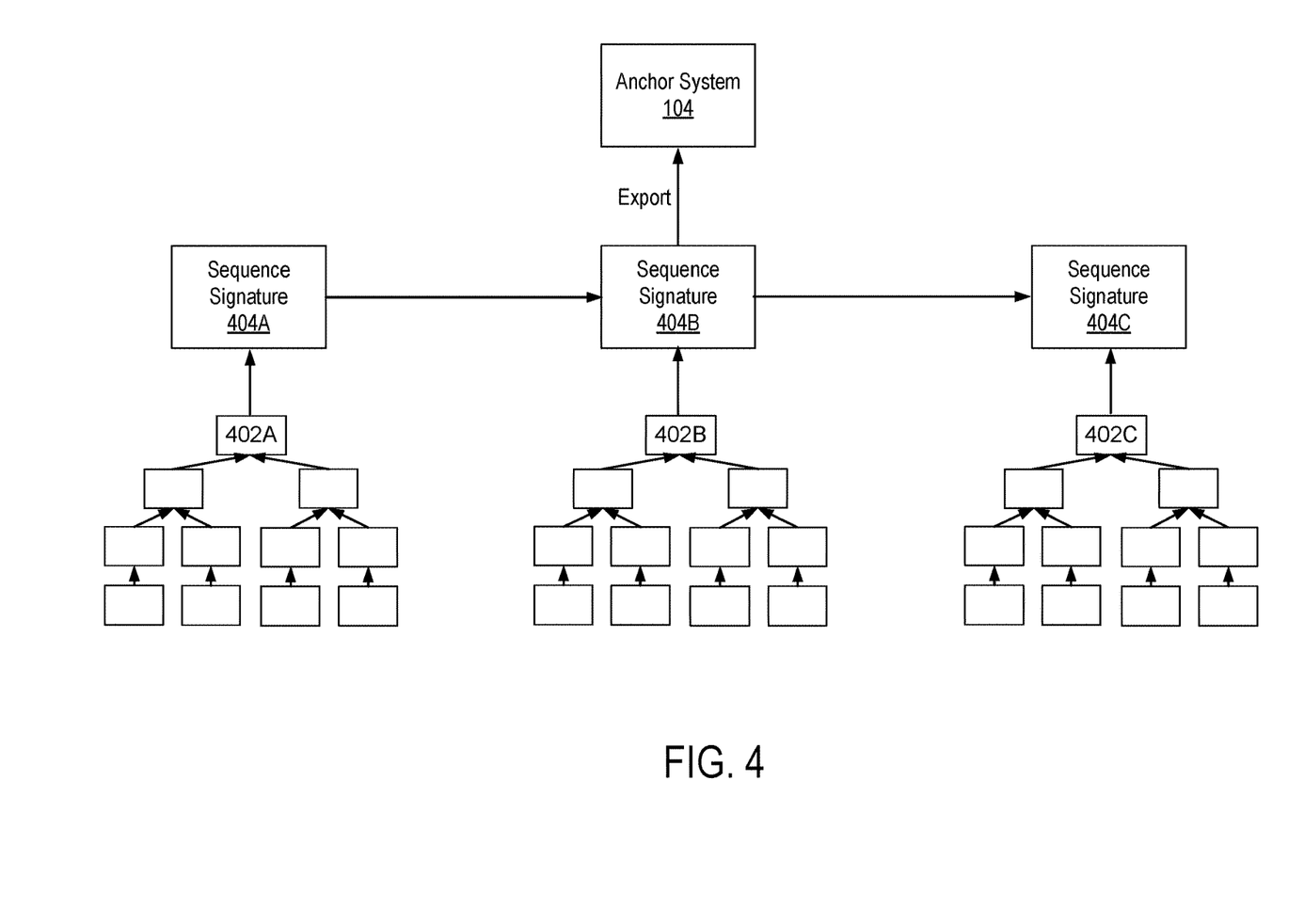
FIG. 4 is a block diagram illustrating the creation of sequence signatures for collections of data in accordance with one embodiment.

FIG. 4 illustrates the creation of sequence signatures 404A, 404B, and 404C for three different collections of data. Hash 402A is the root hash of a first collection, hash 402B is the root hash of a second collection, and hash 402C is the root hash of a third collection. Sequence signature 404A is created by the data storage system 102 for the first collection based on hash 402A. In this example, sequence signature 404A is the first signature in the chain of sequence signatures stored by the signature database 112.

Sequence signature 404B is created by the data storage system 102 for the second collection by hashing sequence signature 404A with root hash 402B. In this example, the data storage system 102 determines to transmit the sequence signature 404B to the anchor system 104 as an export anchor. Sequence signature 404C is created by the data storage system 102 for the third collection by hashing sequence signature 404B with root hash 402C. The sequence signatures 404A, 404B, and 404C are stored in the signature database 112 and connected via edges.

As part of auditing the data storage system 102, if the audit system 106 compares an export anchor of a collection to the sequence signature included in the corresponding node of the signature database 112 and the two do not match, the audit system 106 determines that the stored collection has been modified. However, the audit system 106 (or the data storage system 102) can go further and determine which specific data elements of the collection have been modified. As described above, an export anchor of a collection includes as metadata the hashes from the binary tree used to create the export anchor. For example, the export anchor of the collection from FIG. 3 would include hashes 304A-304D. The sequence signature to which the export anchor is compared also includes as metadata a binary tree of hashes that were used to create the sequence signature. Each of the hashes from the sequence signature's binary tree corresponds to one of the hashes from the export anchor's binary tree.

Continuing with the example from FIG. 3, if the export anchor does not match with the sequence signature to which it is compared, the audit system 106 can compare hash 304E to the corresponding hash associated with sequence signature and also compare hash 304F with its corresponding hash. If hash 304E does not match the corresponding hash, the audit system 106 determines that data elements 302A and/or data element 302B were modified.

The audit system 106 can go a step further and compare hashes from a lower level of the binary tree to determine which specific data elements were modified. In this example, hashes 304A and 304B would be compared to corresponding hashes of the sequence signature. If hash 304A does not match its corresponding hash, the audit system 106 determines that data element 302A has been modified. Similarly if hash 304B does not match its corresponding hash, the audit system 106 determines that data element 302B has been modified. In other embodiments, instead of taking a top down approach and first comparing hashes 304E and 304F, the audit system 106 could start at the bottom and compare hashes 304A-304D with corresponding hashes of the sequence signature. However, if a collection includes thousands of data elements, it is faster to find which data elements have been modified using the top down approach.

Figure 5A:
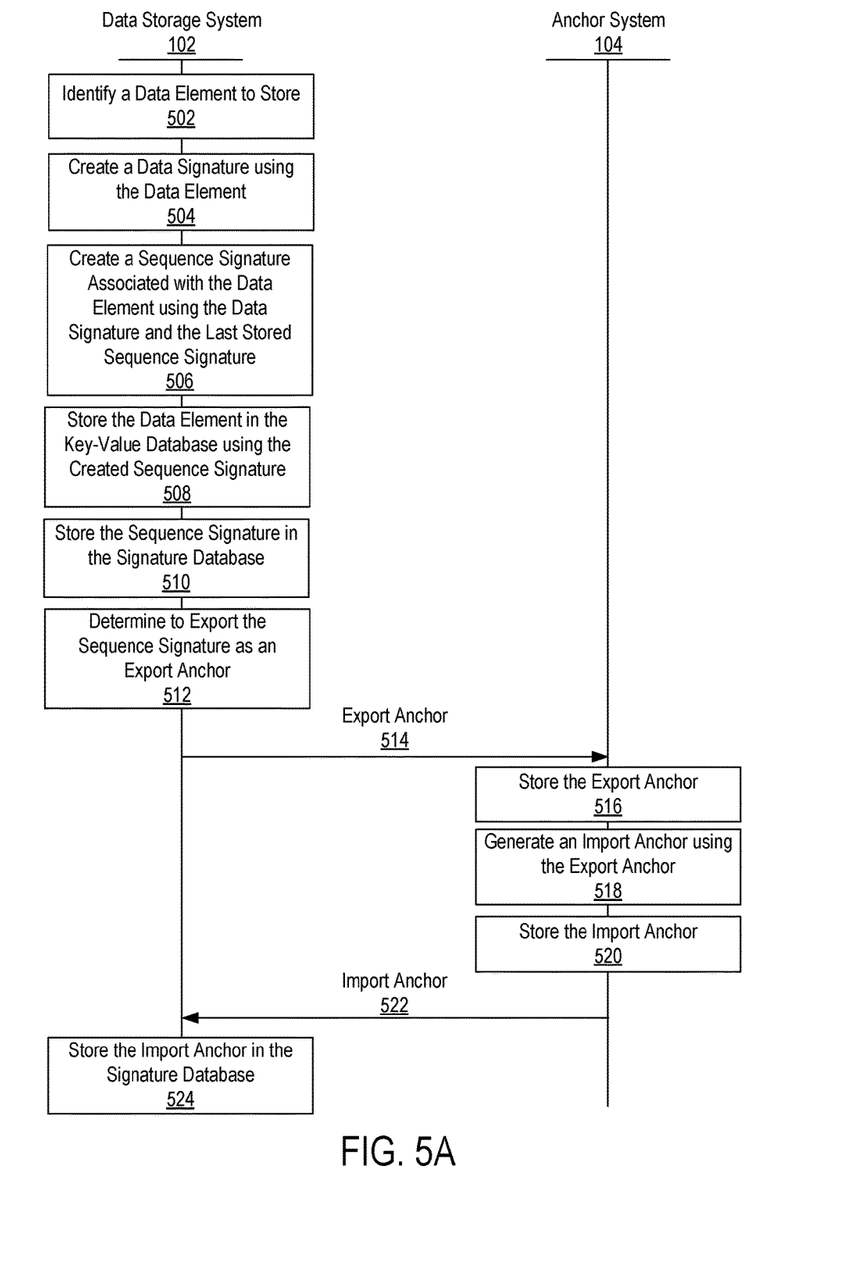
FIG. 5A is an interaction diagram illustrating a process for storing a data element in accordance with one embodiment.

FIG. 5A is an interaction diagram illustrating a process for storing a data element in accordance with one embodiment. The interaction diagram illustrates the steps performed by the data storage system 102 and the anchor system 104. Those of skill in the art will recognize that other embodiments can perform the steps described for FIG. 5A in different order. Moreover, other embodiments can include different and/or additional steps than the ones described.

The data storage system 102 identifies 502 a data element to store. The data storage system 102 creates 504 a data signature using the data element. The data storage system 102 creates 506 a sequence signature associated with the data element using the data signature and the last sequence signature stored by the data storage system 102. The data storage system 102 retrieves the last stored sequence signature from the root node of the signature database 112.

The data storage system 102 stores 508 the data element in the key-value database 110 using the created sequence signature as the key. In other embodiment, the data storage system 102 stores the data element in key-value database 110 using the data signature created for the data element. Additionally, the data storage system 102 stores 510 the sequence signature in the signature database 112. The node in which the sequence signature is stored becomes the root node and is connected to the previous root node via an edge. The data storage system 102 determines 512 to export the sequence signature to the anchor system 104 based on settings of the data storage system 102. The data storage system 102 transmits 514 the sequence signature to the anchor system 104 as an export anchor.

The anchor system 104 stores 516 the export anchor. The anchor system 104 generates 518 an import anchor using the export anchor and information associated with the present time. The anchor system 104 stores 520 the import anchor transmits 522 the import anchor to the data storage system 102. The data storage system 102 stores 524 the import anchor in the signature database 112.

Figure 5B:
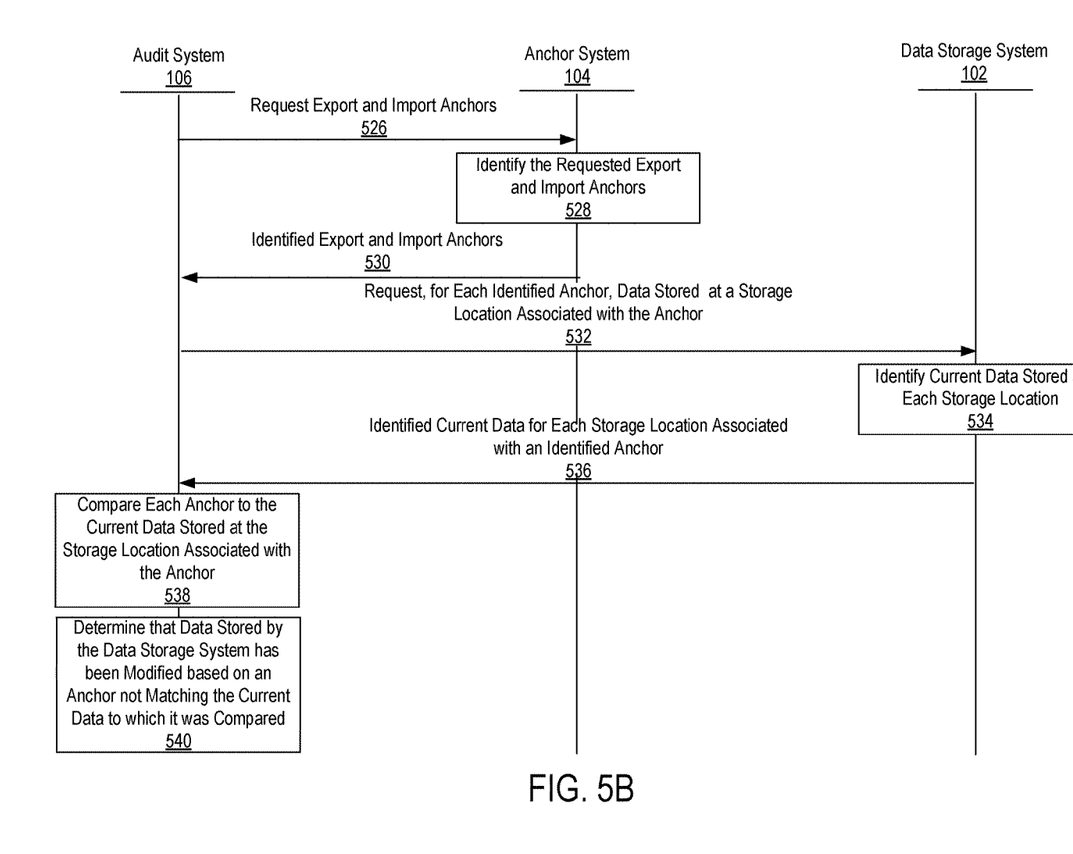
FIG. 5B is an interaction diagram illustrating a process for auditing the data storage system in accordance with one embodiment.

FIG. 5B an interaction diagram illustrating a process for auditing the data storage system 102 to determine whether data stored by the data storage system 102 has been modified. The interaction diagram illustrates the steps performed by the audit system 106, the anchor system 104, and the data storage system 102. Those of skill in the art will recognize that other embodiments can perform the steps described for FIG. 5B in different order. Moreover, other embodiments can include different and/or additional steps than the ones described.

Assume for purposes of this example that the anchor system 104 is currently storing multiple export anchors and import anchors in the anchor database 114. Each export anchor was received by the anchor system 104 from the data storage system 102 as a copy of a data signature stored in the signature database 112. The data signature was generated based on a data element stored by the data storage system 102. Additionally, associated with the export anchor is a storage location (e.g., a node) where the sequence signature was stored in the signature database 112 when the export anchor was transmitted to the anchor system 104. Each import anchor stored by the anchor system 104 was created based on one of the export anchors. Further, associated with each import anchor is a storage location where a copy of the import anchor was stored in the signature database 112 when the copy was transmitted by the anchor system 104 to the data storage system 102.

The audit system 106 requests 526 export anchors and import anchors from the anchor system 104. For example, the audit system 106 may request that the anchor system 104 provide randomly selected export anchors and import anchors. As another example, the audit system 106 may request export anchors and import anchors created during specific time periods (e.g., in the last 24 hours). The anchor system 104 identifies 528 the requested export anchors and import anchors in the anchor database 114 and transmits 530 them to the audit system 106.

For each anchor received, the audit system 106 requests 532 from the data storage system 102 current data stored in the signature database 112 at a storage location associated with the anchor. The data storage system 102 identifies 534 the current data requested and transmits 536 the current data to the audit system 106.

The audit system 106 compares 538 each anchor received to the current data stored at the storage location associated with the anchor. The audit system 106 determines 540 that data stored by the data storage system 102 has been modified if one of the anchors does not match the current data stored at associated storage location.

Figure 6:
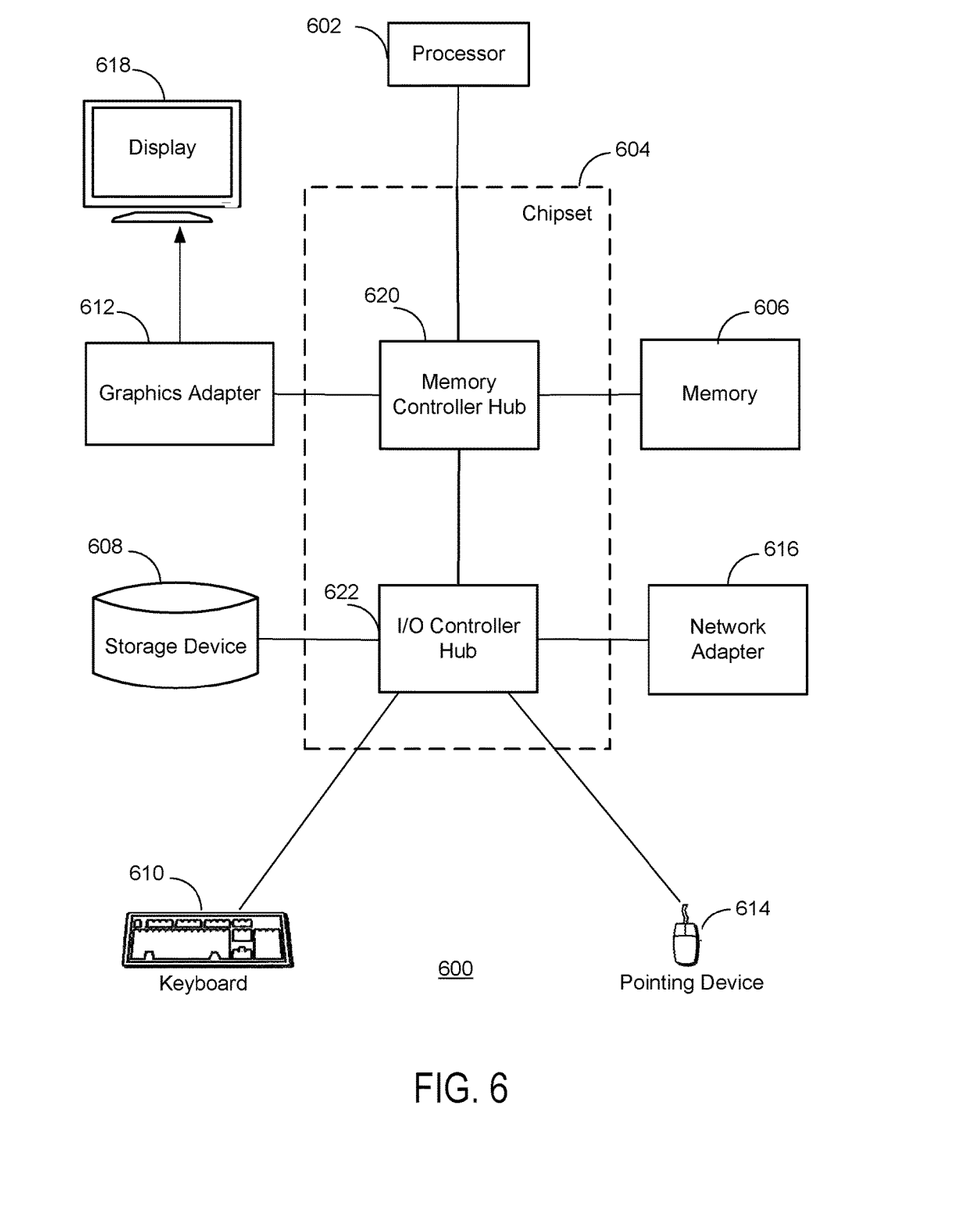
FIG. 6 is a block diagram illustrating a functional view of a typical computer system in accordance with one embodiment.

FIG. 6 is a block diagram illustrating a functional view of a typical computer system 600 for use as one of the systems illustrated in the environment 100 of FIG. 1 in accordance with one embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is a non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to the network 108. Some embodiments of the computer system 600 have different and/or other components than those shown in FIG. 6.

The computer 600 is adapted to execute computer program modules for providing the functionality described herein. As used herein, the term "module" to refers to computer program instruction and other logic for providing a specified functionality. A module can be implemented in hardware, firmware, and/or software. A module is typically stored on the storage device 608, loaded into the memory 606, and executed by the processor 602.

A module can include one or more processes, and/or be provided by only part of a process. Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The types of computer systems 600 used by the systems of FIG. 1 can vary depending upon the embodiment and the processing power used by the entity. Further, the foregoing described embodiments have been presented for the purpose of illustration; they are not intended to be exhaustive or to limiting to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, described modules may be embodied in software, firmware, hardware, or any combinations thereof.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

What is claimed is:

1. A computer implemented method comprising:
receiving, by a first computer system, second data to store;
generating, by the first computer system, a second hash based on the second data and a first hash that was generated based on first data stored in the first computer system;
storing, by the first computer system, the second hash;
transmitting, by the first computer system to a second computer system, a copy of the second hash;
receiving, by the first computer system from the second computer system, an import anchor generated based on the copy of the second hash and a time stamp generated by a time stamping authority; and
storing, by the first computer system, the import anchor in association with the second hash, such that the import anchor provides a cryptographic proof for verifying whether the second data stored at the first computer system was not modified.

2. The method of claim 1, wherein the first hash, the second hash and the import anchor are stored by the first computer system according to a data structure in which the first hash, the second hash and import anchor are linked.

3. The method of claim 1, wherein the first hash, the second hash and the import anchor are stored by the first computer system according to a directed acyclic graph (DAG) in which the first hash, the second hash and the import anchor are connected via one or more edges.

4. The method of claim 1, wherein storing the import anchor comprises:
identifying a node in a DAG that is currently a root of the DAG, the DAG including the first hash and the second hash;
adding an additional node to the DAG that includes the import anchor; and
connecting the additional node to the identified node via an edge, the additional node becoming a new root of the DAG.

5. The method of claim 1, wherein the import anchor is generated based on the copy of the second hash and information unique to present time.

6. The method of claim 1, wherein the import anchor is generated based on the copy of the second hash and text of a publication published on a same day as the creation of the second hash.

7. The method of claim 1, wherein the copy of the second hash stored at the second computer system is compared to the second hash stored at a storage location in the first computer system and a determination is made that the second data has been modified based on the copy of the second hash not matching the second hash stored at the storage location.

8. The method of claim 1, wherein generating the second hash comprises:
generating a third hash by applying a hash function to the second data; and
generating the second hash by hashing the first hash and the third hash.

9. The method of claim 1, further comprising:
storing the second data in a key-value database using the second hash as a key.

10. The method of claim 1, wherein the second data is comprised of a plurality of data elements and creating the second hash comprises:
pairing the plurality of data elements;
generating a pair hash for each pair of data elements;
generating a root hash based on the pair hashes; and
generating the second hash by hashing the root hash and the first hash.

11. The method of claim 1, wherein the second data is comprised of a plurality of data elements and the method further comprises, for each of the plurality of data elements:
generating an element hash by applying a hash function to the data element; and
storing the data element in a key-value database using the element hash as a key.

12. A computer implemented method comprising:
receiving, by a first computer system, second data to store;
generating, by the first computer system, a second hash based on the second data and a first hash that was generated based on first data stored in the first computer system;
storing, by the first computer system, the second hash;
transmitting, by the first computer system to a second computer system, a copy of the second hash;
receiving, by the first computer system from the second computer system, an import anchor generated based on the copy of the second; and
storing, by the first computer system, the import anchor in association with the second hash, such that the import anchor provides a cryptographic proof for verifying whether the second data stored at the first computer system was not modified; and wherein the second computer system initiates storage of the copy of the second hash in a block of a blockchain and the import anchor is generated based on the copy of the second hash and an identifier associated with the block of the blockchain.

13. A computer implemented method comprising:

receiving, by a first computer system, a copy of a first hash stored by a second computer system at a storage location, the first hash generated based on stored first data and a second hash in the second computer system, the second hash generated based on second data stored prior to the first data;

generating an import anchor based on the first hash and a time stamp generated by a time stamping authority;

storing the import anchor;

transmitting a copy of the import anchor to the second computer system, the copy of the import anchor stored at an additional storage location by the second computer system and associated with the first hash stored by the second computer system;

identifying, by the first computer system after receiving the copy of the first hash, current data stored at the storage location and a current anchor stored at the additional storage location;

comparing, by the first computer system, the copy of the first hash to the current data and the import anchor to the current anchor; and determining, by the first computer system whether the first data has been modified based on the comparing.

14. The method of claim 13, wherein determining whether the first data has been modified comprises:

determining that the first data has been modified based on the copy of the first hash being different than the current data.

15. The method of claim 13, wherein determining whether the first data has been modified comprises:

determining that the first data has not been modified based on the copy of the first hash matching the current data.

16. The method of claim 13, wherein:

generating the import anchor is further based on information unique to present time.

17. The method of claim 13, wherein the first data is comprised of a plurality of data elements, and the method further comprising:

identifying a first plurality of hashes used to create the first hash, the first plurality of hashes received with the copy of the first hash and each of the first plurality of hashes associated with one of a plurality of levels;

comparing each of the first plurality of hashes associated with a first level from the plurality of levels to a corresponding hash from a second plurality of hashes stored at the storage location;

responsive to a compared hash from the first plurality of hashes not matching the corresponding hash from the second plurality of hashes, identifying a subset of data elements from the plurality of data elements; and determining that at least one data element from the subset of data elements has been modified.

18. A non-transitory computer readable storage medium comprising computer-executable instructions which when executed by one or more processors cause the one or more processors to perform steps comprising:

receiving, by a first computer system, second data to store;

generating, by the first computer system, a second hash based on the second data, and a first hash that was generated based on first data stored in the first computer system;

storing, by the first computer system, the second hash;

transmitting, by the first computer system to a second computer system, a copy of the second hash;

receiving, by the first computer system from the second computer system, an import anchor generated based on the copy of the second hash and a time stamp generated by a time stamping authority; and storing, by the first computer system, the import anchor in association with the second hash, such that the import anchor provides a cryptographic proof for ensuring that the second data stored at the first computer system was not modified after storage.

* * * * *